(12) United States Patent
Tulac et al.

(10) Patent No.: US 7,925,632 B2
(45) Date of Patent: Apr. 12, 2011

(54) TRANSIENT DATA FACILITY FOR DATABASE APPLICATIONS

(75) Inventors: Sanjin Tulac, Mountain View, CA (US); Min Lu, Fremont, CA (US); Jon Rexford Degenhardt, Mountain View, CA (US); Sudhakar Kaki, Pleasanton, CA (US)

(73) Assignee: Oracle Corporation, Redwood Shores, CA (US)

(*) Notice: Subject to any disclaimer, the term of this patent is extended or adjusted under 35 U.S.C. 154(b) by 970 days.

(21) Appl. No.: 11/546,837

(22) Filed: Oct. 11, 2006

(65) Prior Publication Data

US 2007/0237086 A1    Oct. 11, 2007

Related U.S. Application Data

(60) Provisional application No. 60/727,248, filed on Oct. 14, 2005, provisional application No. 60/726,830, filed on Oct. 14, 2005.

(51) Int. Cl.
*G06F 7/00* (2006.01)
*G06F 15/16* (2006.01)

(52) U.S. Cl. ........ 707/663; 707/791; 707/793; 709/203; 709/217

(58) Field of Classification Search .......... 707/201, 707/204, 2, 3, 663, 791, 793; 709/203, 217
See application file for complete search history.

(56) References Cited

U.S. PATENT DOCUMENTS

| | | | |
|---|---|---|---|
| 6,658,433 B1 * | 12/2003 | Toohey | 707/201 |
| 2003/0105805 A1 * | 6/2003 | Jorgenson | 709/203 |
| 2003/0225746 A1 * | 12/2003 | Braun et al. | 707/3 |
| 2005/0228796 A1 * | 10/2005 | Jung | 707/10 |

* cited by examiner

*Primary Examiner* — Apu M Mofiz
*Assistant Examiner* — Cindy Nguyen
(74) *Attorney, Agent, or Firm* — Campbell Stephenson LLP

(57) ABSTRACT

In one embodiment, a method for providing a transient data facility for database applications includes creating a definition of transient data that corresponds to a unit of work to be performed by an application, and mapping the definition of transient data to a temporary storage table. The method further includes storing the transient data in the temporary storage table while the application performs the unit of work spanning one or more user sessions, and deleting the transient data after the application completes the unit of work.

22 Claims, 10 Drawing Sheets

TRANSIENT DATA FACILITY FOR DATABASE APPLICATIONS

RELATED APPLICATIONS

The present application claims priority to U.S. Provisional Application Ser. Nos. 60/727,248 and 60/726,830, both filed Oct. 14, 2005, which are incorporated herein in their entirety.

FIELD OF THE INVENTION

Embodiments of the present invention relate generally to data processing, and more particularly to providing a transient data facility for database applications.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Oracle Corp., All Rights Reserved.

BACKGROUND OF THE INVENTION

Enterprise applications typically use database-level data definitions and access facilities for maintaining long-term, transactional and reference business data records. These definitions include database table and column definitions for stored data. In addition to long-term data, enterprise applications usually need to store and access transient data that have a limited life cycle. For example, an application performing a certain task may need to perform some intermediate calculations and then use the calculation results later in the task.

Existing programming techniques allow a programmer to define transient data for an application by creating local variables. A local variable stores some value while the application is running. Once the application stops running, the value stored in the local variable is discarded. For example, in a user interface (UI) based application, transient data is stored in a local variable during a user session and is discarded when the user session ends.

A business operation utilizing transient data may be lengthy and span multiple user sessions. One approach for achieving persistence of transient data involves creating table and column level schema definitions for all required intermediate data elements. However, this approach greatly expands the number of required tables and columns, and creates significant difficulties when business processes and algorithms used to solve business requirements need to be modified.

SUMMARY OF THE INVENTION

The present invention relates to various aspects of providing a transient data facility for database applications.

According to one aspect of the present invention, an exemplary method includes creating a definition of transient data that corresponds to a unit of work to be performed by an application, and mapping the definition of the transient data to a temporary storage table. The method further includes storing the transient data in the temporary storage table while the application performs the unit of work spanning one or more user sessions, and deleting the transient data after the application completes the unit of work.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
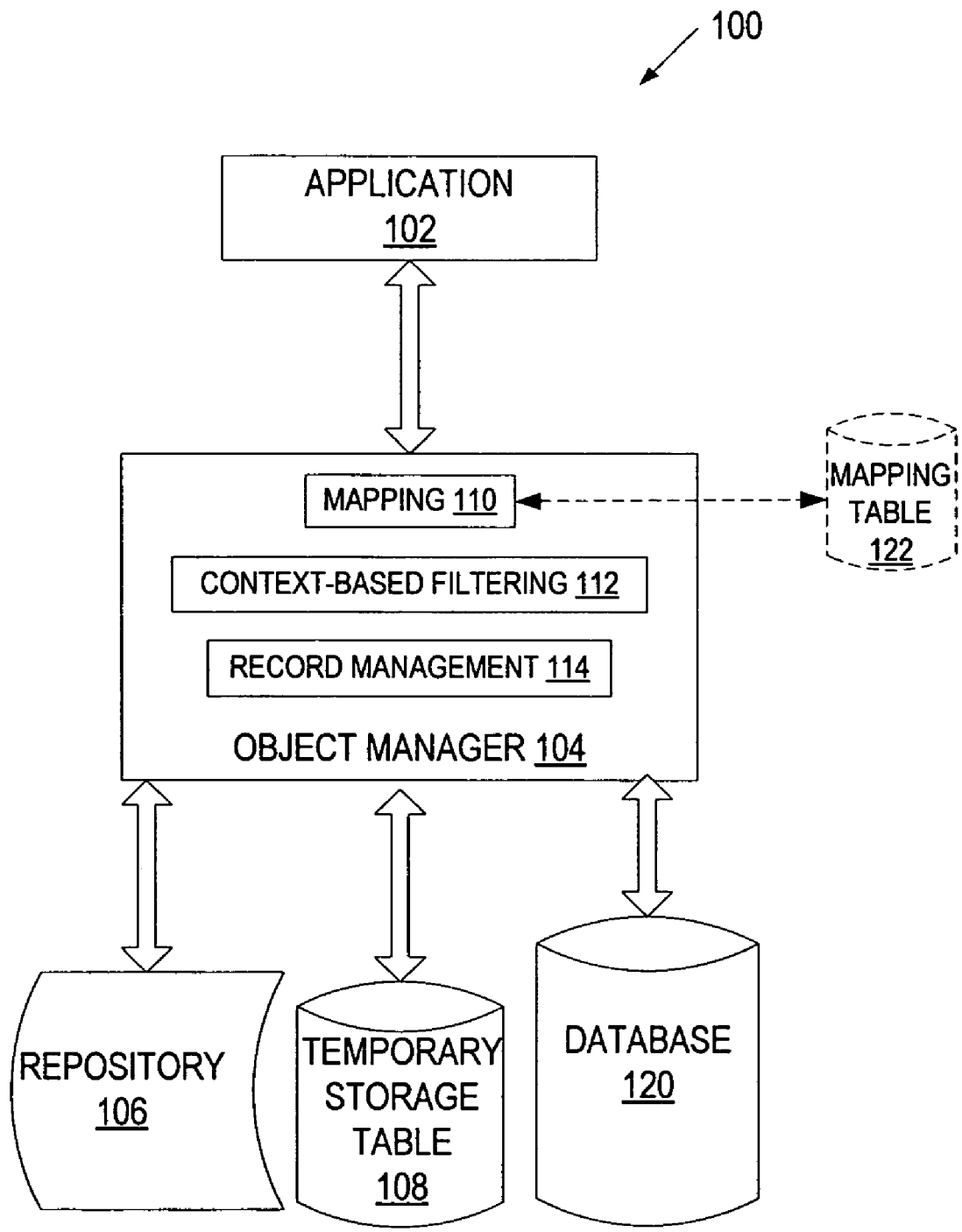
FIG. 1 is a block diagram of one embodiment of a system for facilitating access and storage of transient data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic, or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system 100 for facilitating access and storage of transient data. The system 100 includes an application 102, an object manager 104, a database 120, a temporary storage table 108, and a repository 106.

The database 102 includes multiple tables with numerous columns to store long-term data such as transactional and reference business data records that need to be maintained for a long period of time.

The application 102 provides data stored in the database 102 to users in response to user requests. The application 102 may reside on an application server and be any software program or module that receives user requests to perform operations involving access of data stored in the database 120. Access of data may include, for example, a search for a specific portion of data stored in the database 120, an update of a specific record in the database 120, an insert of a new record into the database 120, a deletion of an existing record from the database 120, etc. The application 102 may allow end users to perform the above operations in the context of units of work such as tasks, services or similar entities, collectively referred to herein as tasks. A task can span multiple user login sessions, process boundaries, and/or database and application server restarts.

The application 102 may also use intermediate (transient) data whose life cycle is limited to the duration of a task. This transient data is defined in the repository 106. The repository 106 may store metadata that defines a task to be performed by the application 102 or any other in-memory data structure. The definition of the transient data describes different fields needed by the application 102 to store temporary values during the life of a task. This description may include, for example, the name of the field, the data type and length of the field, etc. Transient data may be defined during the design of the application 102 when a user specifies properties of the task to be performed by the application 102. In one embodiment, the definition of transient data is in the form of metadata that provides a unified way for characterizing various data types for both transient and non-transient data.

The object manager 104 performs data management for the application 102. In one embodiment, the object manager 104 acts as a server towards multiple clients represented by application servers, including the application server hosting the application 102. Alternatively, the application server hosting the application 102 is the only client of the object manager 104. The object manager 104 supports transaction isolation for operations performed within the boundary of a task in a manner transparent to its client(s). In particular, the application 102 may be unaware of the structure of a data storage facility and may communicate with the object manager 104 by referring to data entities as business objects and business components. A business component associates data items defining a specific business entity (e.g., account, opportunity, etc.) into a single structure. This structure may correspond to a set of columns from one or more database tables. A business object combines related business components and defines a hierarchical relationship between these business components.

In one embodiment, the object manager 104 allows the application 102 to store and access transient data during the life of the task that may span multiple user sessions, process boundaries, and database and application server restarts. In particular, the object manager 104 can receive transient data from the application 102 during a first user session and allow this transient data to persist across multiple user sessions, until receiving an indication from the application 102 that the task has ended. For example, if a user pauses a task during a first user session, and then resumes it during a second user session, the object manager 104 allows transient data to persist across the second user session.

The object manager 104 stores transient data received during the life of the task in the temporary storage table 108. The temporary storage table 108 may reside on the same database server as the database 120 or on a separate database server. The object manager 104 determines where in the temporary storage table 108 a particular temporary value should be stored based on mappings between definitions of transient data fields in the store 106 and columns in the temporary storage table 108. One embodiment of a mapping algorithm 110 used by the object manager 104 to create the above mappings will be discussed in more detail below in conjunction with FIG. 3. In one embodiment, the object manager 104 stores the mappings in a mapping table 122. The mapping table 122 may reside on the same database server as the database 120 or a different database server.

In one embodiment, the object manager 104 stores transient data with a corresponding context identifier (ID) provided by the application 102. A context ID is an identifier of a unit of work or a sub-unit of work, during which transient data is processed by the application 102. For example, a context ID may be a task instance ID or a subtask instance ID.

The subtask instance ID may include a combination of an ID of a parent task instance and an ID of an instance of a subtask performed within the parent task instance. When the task instance is completed, the corresponding transient data is discarded.

In addition to transient data, in one embodiment, the temporary storage table 108 also stores all changes occurring to the permanent data from the database 102 during the life of the task. When the task is completed, the object manager 104 may commit all permanent data changes to the database 106 or rollback the permanent data changes in the temporary storage table 108.

In one embodiment, when the application 102 issues a request pertaining to transient data (e.g., read a transient data value, write a transient data value, etc.), the object manager 104 performs automatic context-based filtering 112 of transient data. In particular, the object manager 104 ensures that transient data manipulated according to the request of the application 102 corresponds to a correct context such as a correct task instance or a subtask instance. For example, if the application 102 maintains multiple instances of a task at the same time, the object manager 104 ensures that the transient data returned to the application 102 corresponds to a task instance being performed by the application 10 when initiating a request for this transient data. One embodiment of a method for providing automatic context-specific filtering of transient data will be discussed in more detail below in conjunction with FIG. 4.

In one embodiment, the object manager 104 performs an automatic record management 114 for transient data stored in the temporary storage table 108. Specifically, the automatic record management 114 creates a record for a new context and ensures that the temporary storage table 108 has only one record per context. The record may include all transient data fields needed by the application 102 to perform the task. One embodiment of a method for providing automatic record management will be discussed in more detail below in conjunction with FIG. 5. Once created, the record for a particular context is deleted only when the context is no longer needed (e.g., when the task is completed).

In another embodiment, the automatic record management 114 may allow for multiple records per context. In yet another embodiment, the object manager 104 does not provide automatic record management and waits for the application 102 to request that a new record be created for a specific context.

By using the temporary storage table 108, database level persistence of transient data is provided while minimal overhead in performance and scalability is maintained, as compared to long-term transactional and reference data stored in the database 120. If business logic underlying the application 102 requires new or different transient data fields, no changes to the schema of the database 102 are needed. Instead, only the mappings between the transient data definition and the columns of the temporary storage table 108 have to be recreated. Furthermore, the use of the temporary storage table 108 enables unified storage definitions and access mechanisms for both transient and long-term data based on the same application programming interfaces (APIs), thus enabling easy access to transient data by various applications and components, as well as seamless support for remote clients.

Figure 2:
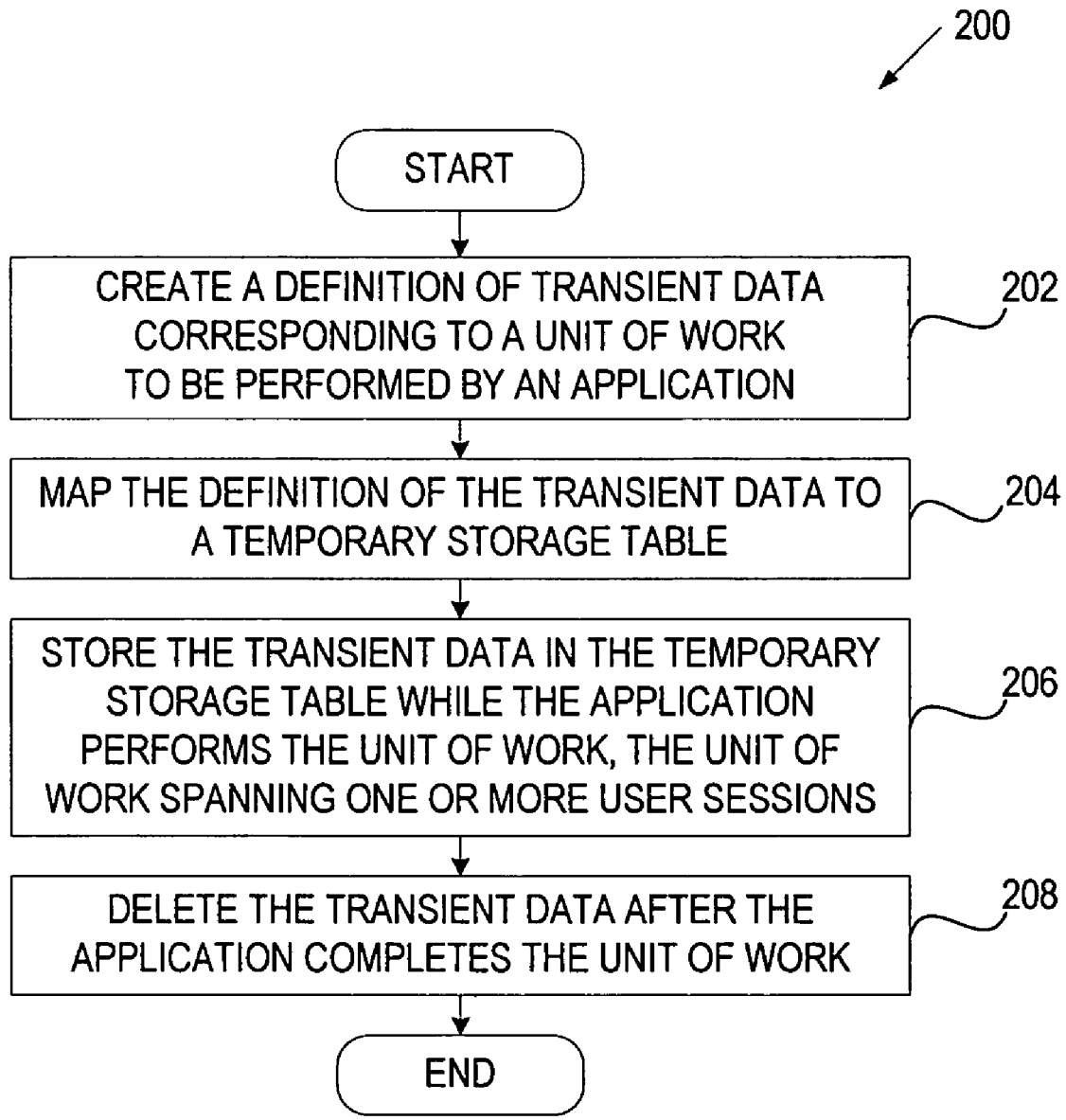
FIG. 2 is a flow diagram of one embodiment of a method for facilitating access and storage of transient data.

FIG. 2 is a flow diagram of one embodiment of a method 200 for facilitating access and storage of transient data. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 2, method 200 begins with processing logic creating a definition of transient data that corresponds to a task or some other unit of work to be performed by an application (block 202). Processing logic may create the definition of the transient data based on user input that identifies different fields for storing temporary values to be used by the application during the life of the task. The user input may identify the type of the field as transient and may specify, for example, the name of the field, the data type and length of the field, etc. In one embodiment, processing logic creates the definition of the transient data in the form of metadata that provides a unified way for characterizing various data types. In one embodiment, processing logic creates the definition of the transient data during the design of the application.

At block 204, processing logic maps the definition of the transient data to a temporary storage table. In particular, processing logic maps different transient data fields to the columns of the temporary storage table. One embodiment of a mapping technique is discussed in more detail below in conjunction with FIG. 3.

At block 206, processing logic stores transient data values in the temporary storage table using mappings created at block 204. The transient data values are stored in the temporary storage table while the application performs the unit of work that may span multiple user sessions, process boundaries, and/or database and application server restarts. In one embodiment, processing logic associates the transient data with an ID of a current context such as a task instance ID or a subtask instance ID. An index may be created for a column storing the context ID to facilitate efficient searches of transient data.

Once the application completes the unit of work, processing logic causes the transient data to be deleted from the temporary storage table (block 208). The transient data may be deleted by a background process based on the context ID identifying the completed unit of work. The deletion may be performed once a new context ID is recorded. Alternatively, if the current context ID is an ID of a sub-unit work (e.g., a subtask instance), the deletion may be performed after a parent context (e.g., a task instance containing the current subtask instance) is changed.

The temporary storage table may contain such columns as a task ID, a subtask ID, and a row ID. The row ID is a unique identifier generated for each row in the table. The combination of a task ID and a subtask ID form a context ID. The temporary storage table may also contain a large number of columns that can be mapped to various transient data fields. In one embodiment, these mappings are stored in a mapping table. The mapping table may include such columns as a task column name column and a source field name column, etc. The task column name column holds column names from the temporary storage table. The source field name column holds names of transient data fields.

As discussed above, the temporary storage table contains a large number of columns to be mapped to columns in the source database tables. In one embodiment, these columns of the temporary storage table cover all possible data types of transient data fields. These types may include, for example, DATETIME, NUMBER, VARGRAPHIC, CLOB, and VARCHAR of different length (e.g., VARCHAR2(1), VARCHAR2(5), VARCHAR2(15), VARCHAR2(20), VARCHAR2(30), VARCHAR2(50), VARCHAR2(75), VARCHAR2(100), VARCHAR2(150), VARCHAR2(255), VARCHAR2(1024) and VARCHAR2(1999)). The temporary storage table may include one or more columns for each of the above types, depending on the number of corresponding transient data fields used by the application.

In one embodiment, mappings of transient data fields to the columns of the temporary storage table are created and stored in a mapping table during the design of the application once the user specifies the transient data fields. The mappings may be re-created if any of the transient data fields are modified (e.g., if the user specifies a new transient data field, deletes an existing transient data field, or modifies the type or size of the existing transient data field).

In another embodiment, mappings of transient data fields to the columns of the temporary storage table are created dynamically during runtime. For example, when a transient data field is processed for a task instance for the first time, a mapping for this field may be created and stored in the mapping table.

A transient data field may be mapped to a column in the temporary storage table that has the same type and the same or greater length. The recorded mapping is then used every time the field is processed within the task instance. Once the task instance is completed, the mapping is purged. In one embodiment, the contents of the temporary storage table are deleted immediately. Alternatively, the deletion is performed by an application server process running in background that purges obsolete temporary data periodically.

Figure 3:
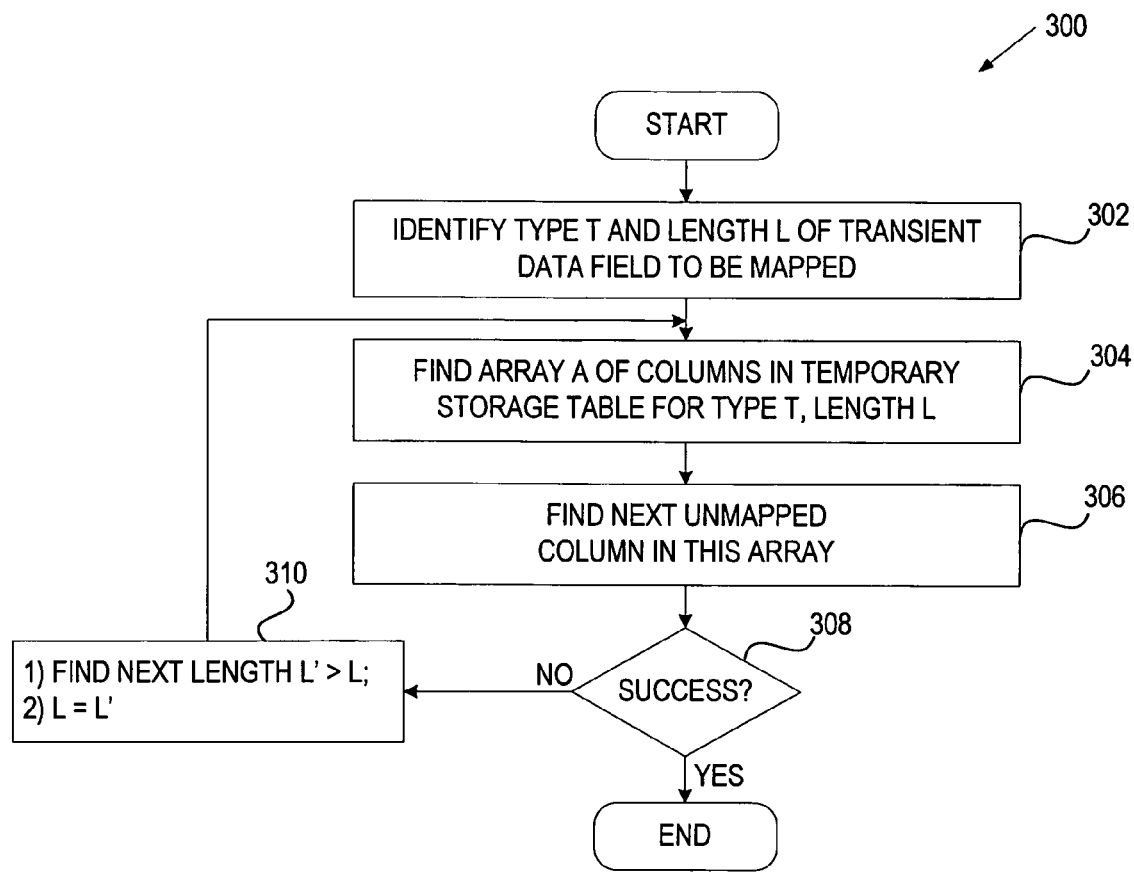
FIG. 3 is a flow diagram of one embodiment of a method for mapping columns of a temporary storage table to the definition of transient data.

FIG. 3 is a flow diagram of one embodiment of a method 300 for mapping columns of a temporary storage table to the definition of the transient data. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 3, method 300 begins with processing logic identifying type T and length L of a transient data field to be mapped (block 302). The type and length are identified based on the definition of the transient data field that may be in the form of metadata or some other form.

At block 304, processing logic finds an array A of columns in a temporary storage table that have the same type and length L.

At block 306, processing logic finds a next column in array A that has not been previously mapped. If such a column is found (block 308), processing logic records the mapping in a mapping table. Otherwise, processing logic finds a next length L' that is greater than L, sets L to L' (block 310), and returns to block 304.

Figure 4:
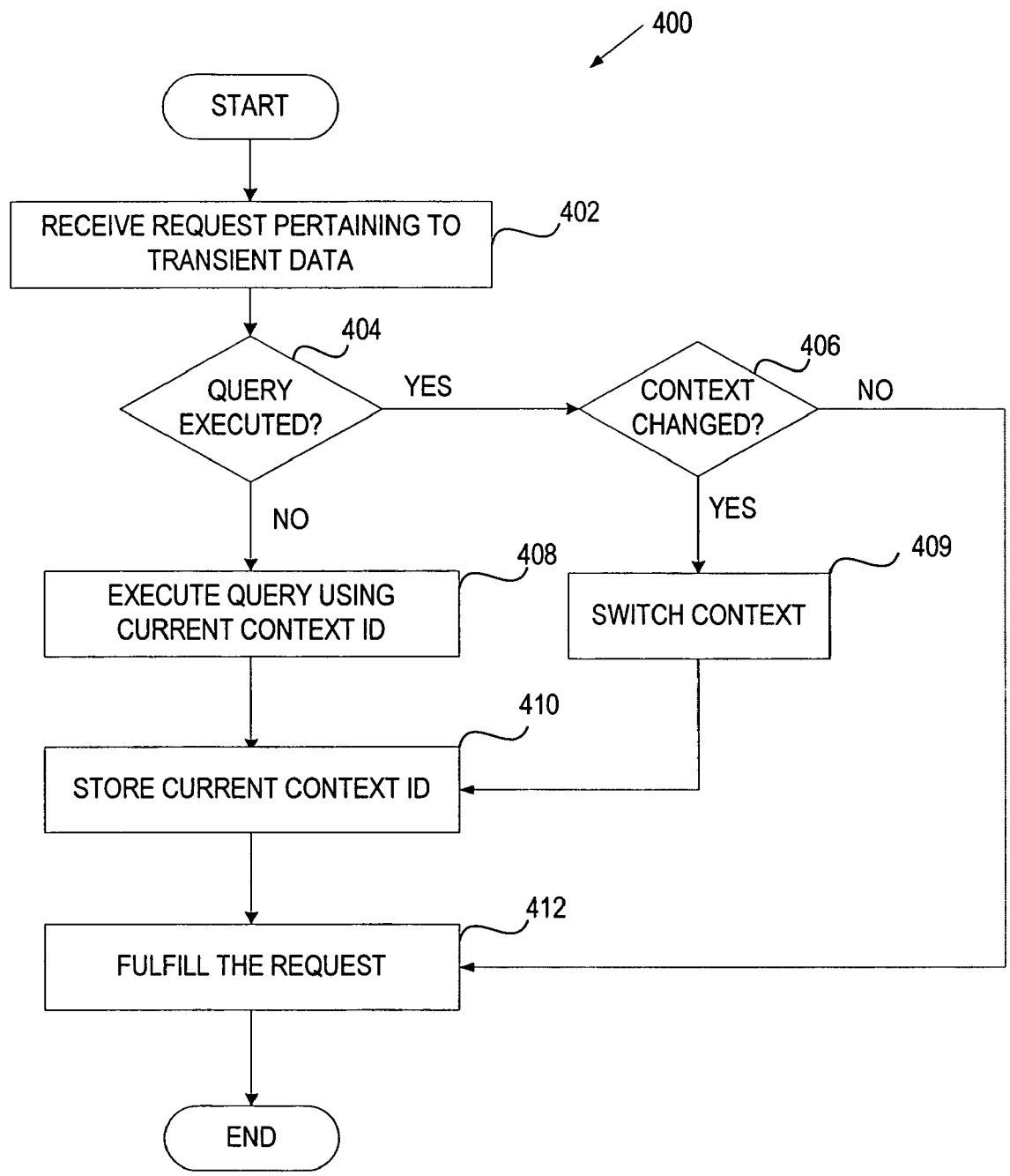
FIG. 4 is a flow diagram of one embodiment of a method for context-based filtering of transient data.

FIG. 4 is a flow diagram of one embodiment of a method 400 for context-based filtering of transient data. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 4, method 400 begins with processing logic receiving a request pertaining to transient data from an application (block 402). The request may be for storing a new temporary value, retrieving an existing temporary value, updating an existing temporary value, etc. In one embodiment, the request includes a current context ID such as a current task ID or subtask ID.

At block 404, processing logic determines whether any data queries have been previously executed for the context ID included in the request. In one embodiment, processing logic maintains a query execution map that indicates context IDs for which a query has been previously executed and its result stored in a cache.

If the determination made at block 404 is positive, processing logic determines whether the context has changed by comparing the context ID provided by the application with the context ID previously stored by processing logic (block 406). If so, context is switched to the one requested by the application (block 409), and processing logic proceeds to block 410. If not, processing logic proceeds to block 412. In addition, if the determination made at block 404 is negative, processing logic proceeds to block 408.

At block 408, processing logic executes a query for transient data using the current context ID provided by the application. In one embodiment, if this is the first time the query is executed for the current context ID, the query does not return any records.

At block 410, processing logic stores the current context ID. In one embodiment, processing logic also updates the query execution map to indicate that the query has been executed for the given context ID.

At block 412, processing logic fulfills the request received from the application. That is, depending on the request, processing logic may cause the record associated with the current context ID to be created or modified in the temporary storage table, a specific transient data value to be retrieved from the temporary storage table, etc.

Hence, method 400 performs automatic context-specific filtering of transient data, ensuring that transient data manipulated according to the application request corresponds to the appropriate context.

Figure 5:
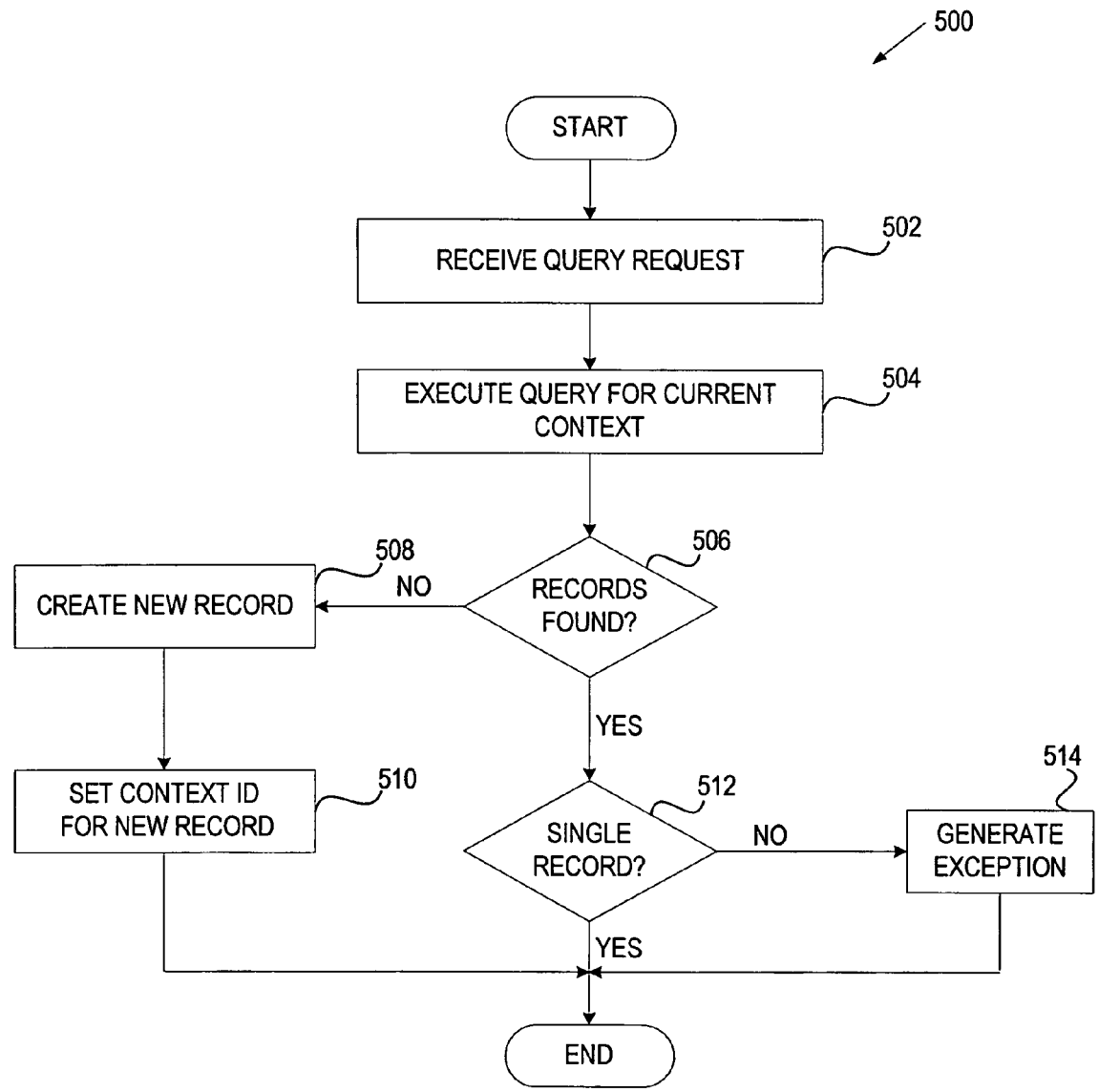
FIG. 5 is a flow diagram of one embodiment of a method for providing automatic record management for transient data.

FIG. 5 is a flow diagram of one embodiment of a method 500 for providing automatic record management for transient data. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 5, method 500 begins with processing logic receiving a query request (block 502). In one embodiment, the query request may specify an ID of the current context for which transient data should be retrieved.

At block 504, processing logic executes the query for the current context. If the query does not return any records (block 506), processing logic creates a new record in the temporary storage table (block 508) and stores the current context ID for the new record (block 510).

If the query returns a single record (block 512), method 500 ends. If the query returns more than one record, processing logic generates an exception indicating that the requirement of having a single record per context is no longer satisfied.

Hence, method 500 provides automatic record management for transient data, ensuring that the temporary storage table has only one record of transient data per context.

In some embodiments, the mechanism for facilitating access and storage of transient data discusses herein is used in building wizard-style, guided user interfaces (UIs) for accomplishing business tasks. A business task may support a variety of different processes including, for example, filling out objectives, applying for a loan, conducting a survey, qualifying a lead, approving expense reports, etc. The wizard-style task UI is a sequence of task specific UI views that lead an end user to perform process-centric work that may include applying business logic, evaluating conditional fields, external system integration, etc. The result is an improved end-user experience with shorter learning curves and higher task completion rates.

Figure 6:
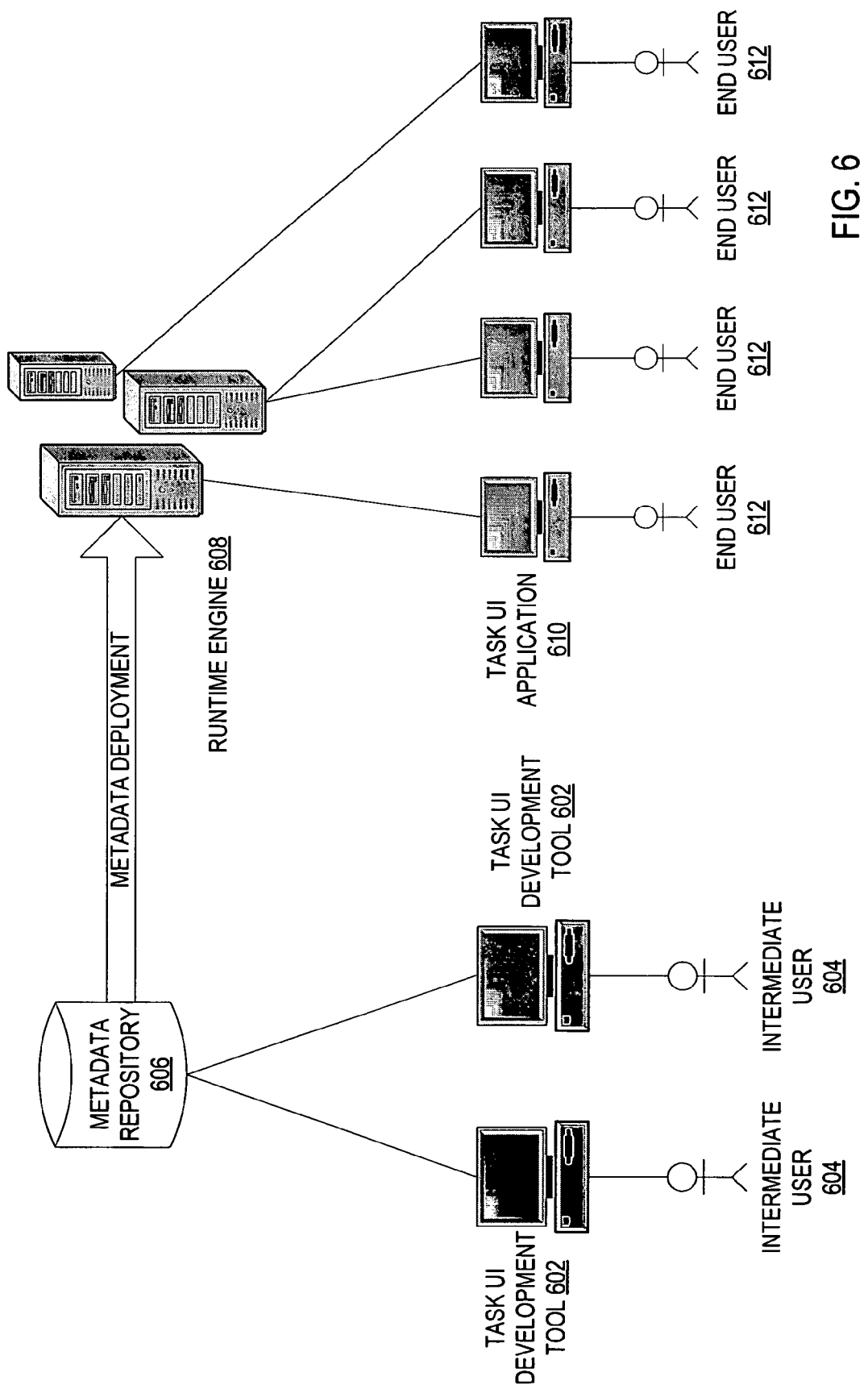
FIG. 6 is a block diagram of one embodiment of a system for building wizard-style UIs for business tasks.

FIG. 6 is a block diagram of one embodiment of a system for building wizard-style UIs for business tasks. The system includes a task UI development tool 602, a metadata repository 606 and a runtime engine 608.

The task UI development tool 602 is a declarative tool that allows intermediate users 604 (e.g., business analysts, software developers, etc.) to design wizard-style UIs for business tasks without writing any code. The tool 602 enables intermediate users 604 to specify steps of a business task and the execution flow for the steps. The steps may include, for example, UI view steps, database operation steps, decision steps, service (external and/or internal) invocation steps, etc. The tool 602 may be a graphical editor that allows an intermediate user 604 to create a visual representation of a task that reflects the task steps and their execution flow. The visual representation of the task may be in the form of a flowchart that includes a sequence of steps to be performed for the business task. In one embodiment, the tool 602 enables an intermediate user 604 to define navigation controls for UI view steps of the task. These navigation controls may include, for example, Next/Previous buttons, Pause button, Cancel button, etc.

The tool 602 also allows an intermediate user 604 to specify properties for the task. These properties may include task-level properties defining characteristics of the task (e.g., the name of the task, transactional behavior, etc.) and step-level properties defining characteristics of individual steps (e.g., fields to be entered by an end user for a UI view step, database fields to be updated for a database operation step, branching conditions for a decision step, the name of a service to be called for a service invocation step, etc.).

The tool 602 may further allow an intermediate user 604 to define transient data to be used during the life of the task. For example, the intermediate user 604 may specify names of different transient data fields, the data type and length of each transient data field, etc.

In one embodiment, the tool 602 converts the visual representation of the task, the task properties and the transient data into a collection of metadata and stores the resulting collection of metadata in the metadata repository 606. In one embodiment, the metadata is represented using an XML document based on an XML schema.

The runtime engine 608 deploys, at runtime, the metadata stored in the metadata repository 606 and processes the metadata to produce a set of wizard-style UIs. The wizard-style UIs are presented to end users 612 by task UI applications 610. The end users 612 may be connected or disconnected mobile users. In one embodiment, mobile end users launch and run while operating in disconnected mode. When the end user is connected, any data resulting from completed tasks is synchronized back to the server.

In one embodiment, the runtime engine 608 provides navigation support for walking end users 612 through UI sequences. In particular, end users can progress through tasks by entering data in the UI view and pressing the Next button to move to the next view. End users can also navigate backward in the task (Previous button), modifying previously entered data if desired, then navigating forward again via the Next button. In one embodiment, at the last step in the task, an end user 612 can use the Submit button to commit the task data to the main database tables.

In one embodiment, the runtime engine 608 performs business operations and dynamically controls view sequencing as the task progresses. This allows the execution of the flow to be dynamically modified based on data entered by the end user 612 during the task. The runtime engine 608 can support several types of operations, including, for example, database accesses, business service calls, and decision steps. Since these operations are performed automatically by the runtime engine 608, rather than by an explicit user actions such as button presses, the end user 612 no longer needs to know when to press particular buttons or in which order.

In one embodiment, changes to business data made as part of a task are not committed to the main database until the end-user has successfully completed the task. New and modified data is kept separate from the main database data and is visible only while the task is executing and only to the end user running the task. When the end user completes the task, all data is committed to the main database and made visible to other users in the enterprise.

In one embodiment, the runtime engine 608 allows an end user 612 to pause a task (e.g., using the Pause button) and resume it at a later time. In one embodiment, paused tasks are displayed in the user's Inbox. The Inbox may support resuming paused tasks and transferring tasks to other users. Once the task is transferred, it appears in the Inbox of the user it was transferred to.

In one embodiment, the runtime engine 608 allows an end user 112 to cancel the task (e.g., using the Cancel button) being run by reverting all changes made during the current session and restoring the task to its last paused state. In one embodiment, a task can be deleted entirely from the Inbox, discarding all the work done in the task.

Figure 7:
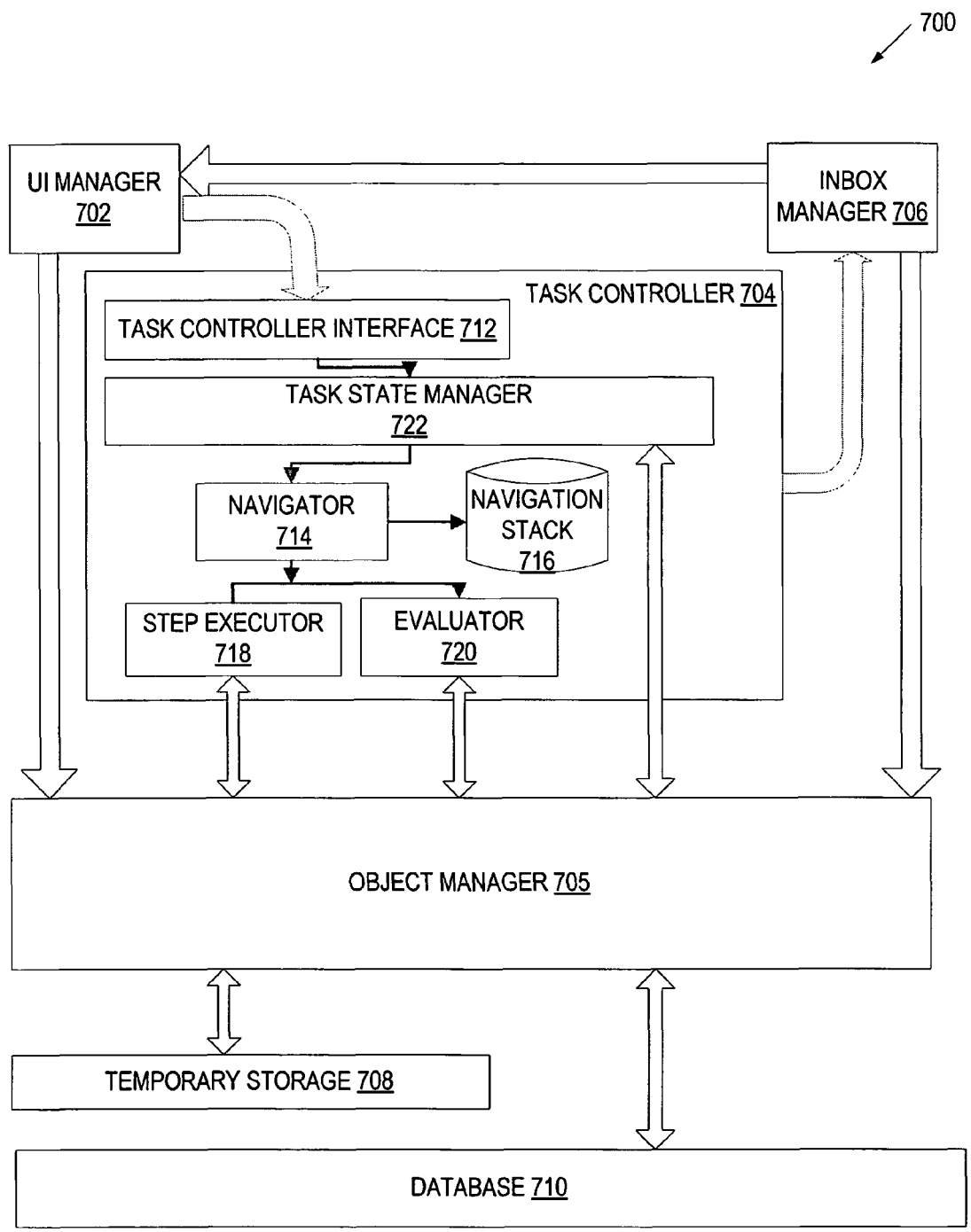
FIG. 7 is a block diagram of one embodiment of a runtime engine

FIG. 7 is a block diagram of one embodiment of a runtime engine 700. The runtime engine 700 includes a UI manager 702, an Inbox manager 706, a task controller 704, an object manager 705, a temporary storage 708 and a main database 710.

The UI manager 702 is responsible for rendering and presenting wizard-style task UIs to end users, and communicating the end user input to the object manager 705 and task controller 704. The Inbox manager 706 is responsible for controlling new and paused tasks stored in users' Inboxes. The task controller 704 is responsible for analyzing metadata pertaining to the task and the end user input, and executing flow and business logic based on this analysis to guide the end user through the business task.

The temporary storage 708 stores data associated with the task throughout the lifetime of the task. In one embodiment, this data is only visible while the task is executing and only to the end user running the task. In another embodiment, the temporary storage 708 may be shared across multiple tasks and their end users. Once an end user successfully completes the task, transient data stored in the temporary storage 708 for this task is discarded, and long-term data stored in the temporary storage 708 for the task is committed to the database 710 and becomes visible to other users in the organization.

The object manager 705 provides data management for the task controller 704, Inbox manager 706 and the UI manager 702. In one embodiment, the object manager 705 supports transaction isolation for operations performed within the boundary of a task in a manner transparent to its client components. The object manager 705 stores updates associated with these operations in the temporary storage 708 until the task controller 704 calls the object manager 705 to commit the data to the database 710. In addition, the object manager 705 stores transient data used during the life of the task in the temporary storage 708, and causes the transient data to be discarded once the task is completed.

In one embodiment, the task controller 704 includes a task controller interface 712, a navigator 714, a step executor 718, an evaluator 720 and a task state manager 722. In one embodiment, the task controller interface 712 interacts with the UI manager 702, and invokes appropriate internal components of the task controller 704. In one embodiment, the task controller interface 712 includes one or more APIs to communicate with different entities.

The navigator 714 calls the step executor 718 to execute the step activity, and pushes the step instance into a navigation stack maintained by the navigator 714.

The navigator 714 is responsible for performing forward and backward navigation. In one embodiment, when at the decision point, the navigator 714 calls the evaluator 720 to evaluate branch condition criteria and determine the forward path. On forward navigation for all other step types, the navigator 714 may call the step executor 718 to execute the activity represented by the step, and push the stack frame into the navigation stack. Each stack frame may contain a reference to the current business object state. The business object is a collection of data associated with particular UI, including data currently entered by the end user. The navigator 714 restores business object states from the navigation stack for the task views during backward navigation.

In one embodiment, the navigator 714 is responsible for handling subtask navigation using the navigation stack and a call stack, which stores local context for the main business task and each subtask within the main business task.

The task state manager 722 is responsible for maintaining the life cycle of task instances and their states. In addition to the navigation stack, task state encompasses the values of all task variables for the current task instance. In one embodiment, the task state manager 722 maintains the life cycle of a task by enforcing its state transition rules.

One embodiment of defining transient data will now be discussed in more detail. As discussed above, the object manager 705 manipulates data using business components. A business component is a logical entity that associates columns from one or more tables into a single structure. Tables in the source database 710 that the business component is based on are referred to herein as base tables. In one embodiment, a hierarchy of classes is defined to provide similar storage definitions and access mechanisms for transient data as those used for transactional and reference data stored in the database 710.

Figure 8:
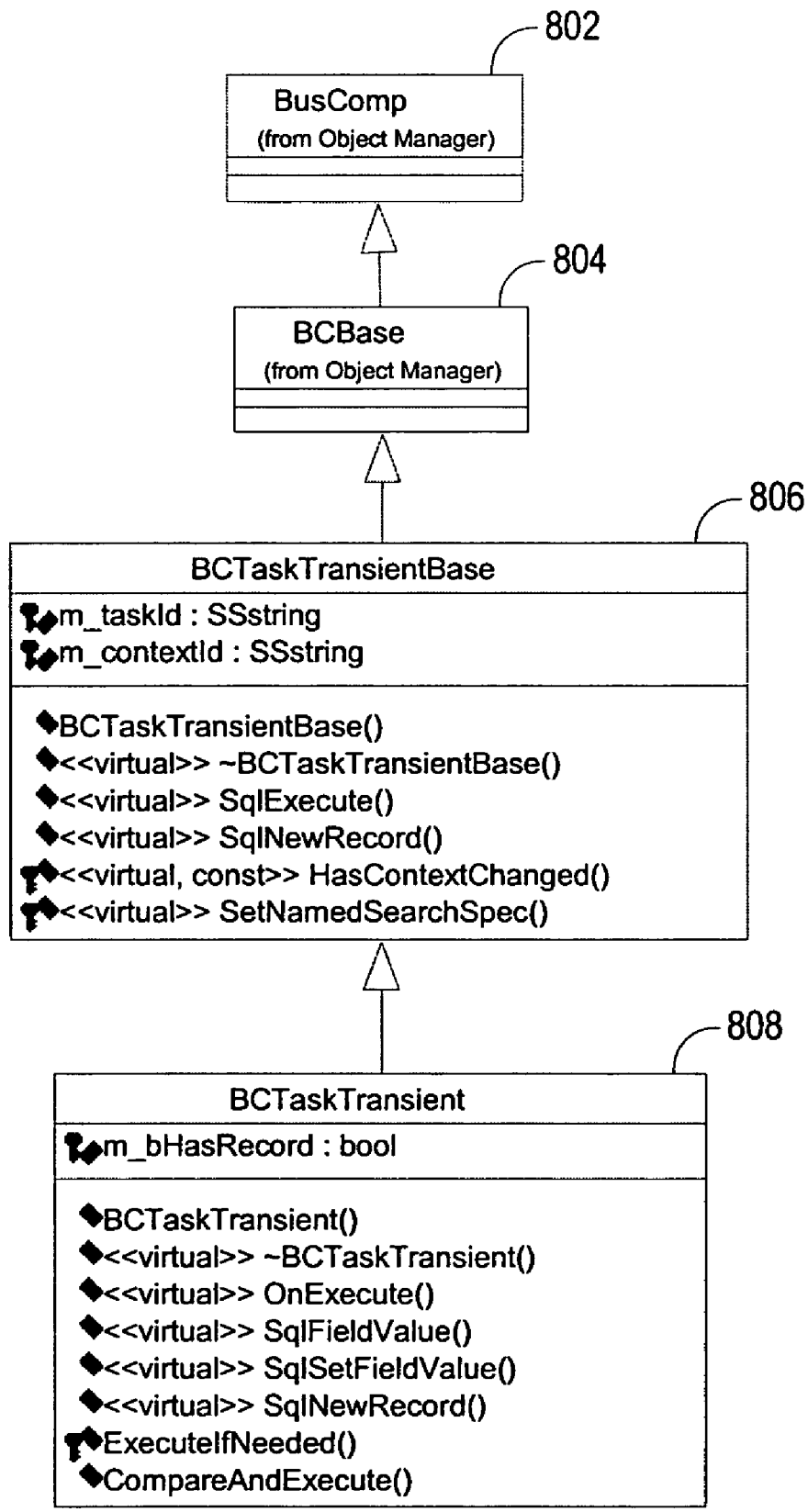
FIG. 8 illustrates an exemplary class hierarchy used for transient data according to one embodiment of the invention.

FIG. 8 illustrates an exemplary class hierarchy used for transient data according to one embodiment of the invention. Similarly to a class hierarchy used for long-term data, the class hierarchy for transient data includes a business component class 802 and a derived business component (BC) base class 804. To integrate transient data into the class hierarchy used for long-term database data, a child of the BC base class 804 is defined that is referred to as a BC task transient base class 806. The BC task transient base class 806 includes a task ID field and a context ID field, as well as a set of methods that provide automatic context-specific filtering of transient data. A BC task transient class 808 is derived from the BC task transient base class 806. The BC task transient class 808 includes a flag that indicates whether a record exists for a specific context ID, and a set of methods that ensure that only one record of transient data is stored for a given context ID.

Figure 9A:
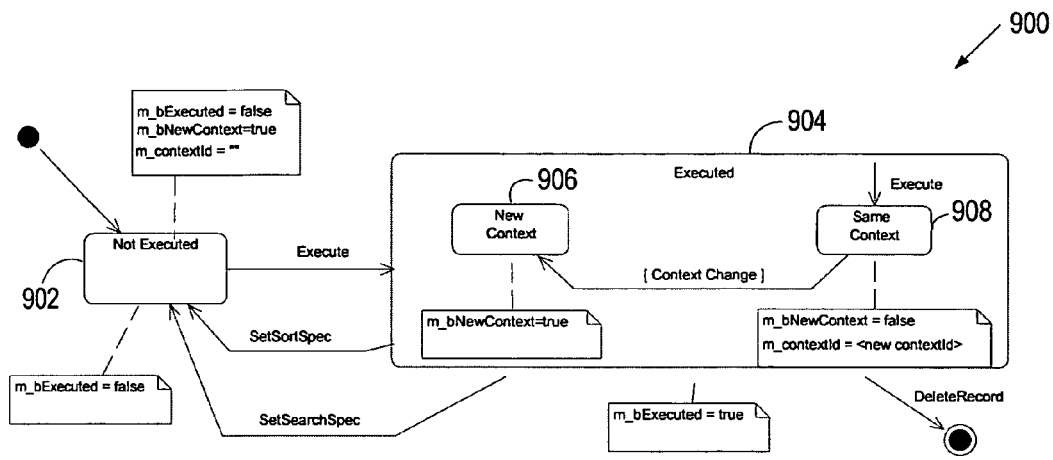
FIG. 9A illustrates a state diagram of a BC task transient base class in accordance with one embodiment of the invention.

FIG. 9A illustrates a state diagram 900 of a BC task transient base class in accordance with one embodiment of the invention. The state diagram 900 includes a non-executed state 902 and an executed state 904 for a transient business component (TBC). When the TBC is in the non-executed state 902, a query execution flag is set to false and a new context ID flag is set to true. When a query is executed, the TBC transitions into the executed state 904. If a context ID change is detected, a new context state 906 is entered, in which a new search specification is set, and a query is executed based on the new search specification to retrieve the content for the new context ID. This results in the TBC entering the same context state 908 again, in which the query execution flag is set to true, the new context ID flag is set to false, and the context ID is set to the new context ID.

Figure 9B:
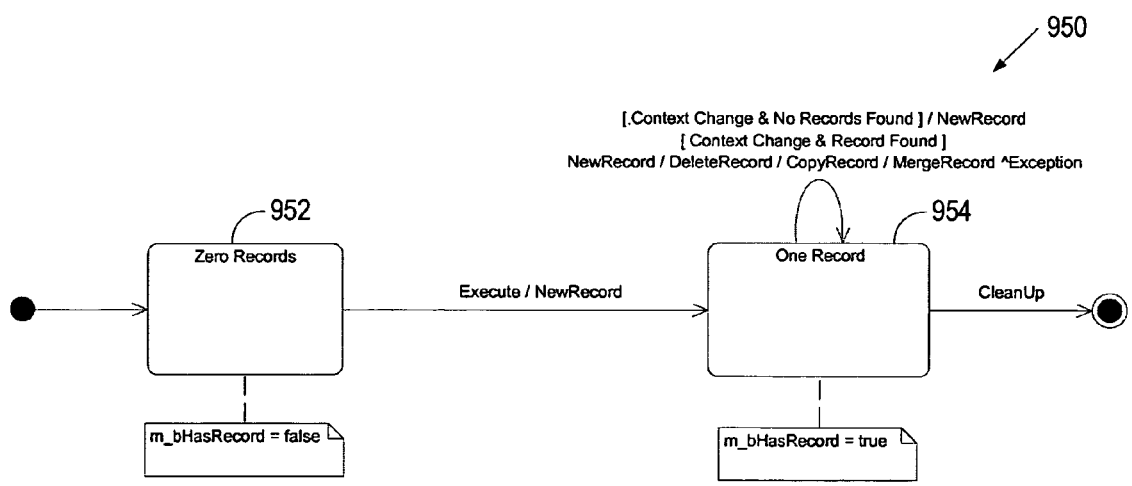
FIG. 9B illustrates a state diagram of a BC task transient class in accordance with one embodiment of the invention.

FIG. 9B illustrates a state diagram 950 of a BC task transient class in accordance with one embodiment of the invention. The state diagram 950 includes a zero records state 952 and a one record state 954. The TBC enters the zero record state 952 if the query executed for the current context ID does not return any records. At that time, a new record is automatically created for the current context ID and the TBC enters into the one record state 954. Multiple records per context are prevented by generating exceptions in operations that would result in the second record. Once created, the record for a particular context is deleted during clean-up, when the context is no longer needed (e.g., when the task is finished).

Figure 10:
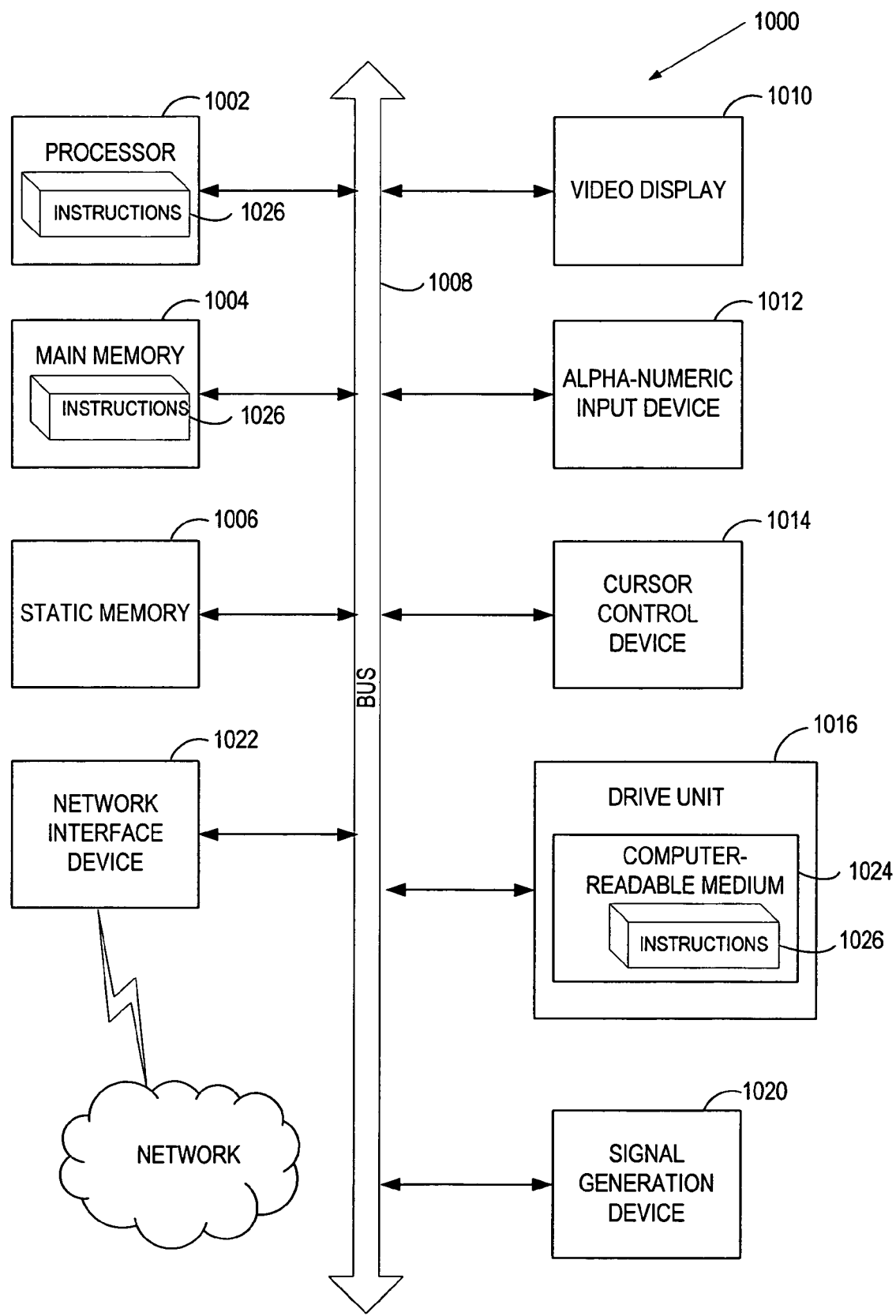
FIG. 10 is a block diagram of an exemplary computer system that may be used to perform one or more of the operations described herein.

FIG. 10 is a block diagram of an exemplary computer system 1000 (e.g., a computer system hosting task controller 204 and/or UI manager 202 of FIG. 2 and/or task UI development tool 102 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computerized method comprising:

creating a definition of transient data corresponding to a unit of work to be performed by an application, wherein the definition of transient data comprises one or more fields that describe a format of one or more columns needed to store transient data;

mapping the definition of transient data to one or more columns of a temporary storage table, wherein a format of a mapped column corresponds to the format described by at least one field of the one or more fields of the definition of transient data;

storing the transient data in the one or more columns of the temporary storage table while the application performs the unit of work, the unit of work spanning one or more user sessions; and deleting the transient data from the temporary storage table after the application completes the unit of work.

2. The method of claim 1 wherein the definition of transient data is created during a design of the application based on user input.

3. The method of claim 1 wherein the definition of transient data comprises metadata characterizing the transient data.

4. The method of claim 1 further comprising:
storing mappings of columns of the temporary storage table to the definition of the transient data in a mapping table.

5. The method of claim 1 wherein storing the transient data in the temporary storage table comprises:
creating a record for the transient data in the temporary storage table in response to a data request of the application.

6. The method of claim 1 further comprising:
associating the transient data with a context identifier in the temporary storage table.

7. The method of claim 6 wherein the context identifier is an identifier of a current unit of work.

8. The method of claim 6 wherein the context identifier is an identifier of a current unit of work or a current sub-unit of work.

9. The method of claim 8 wherein:
the current unit of work is a current task; and
the current sub-unit of work is a current subtask within the current task.

10. The method of claim 6 further comprising:
automatically filtering the transient data based on a context.

11. The method of claim 6 further comprising:
providing automatic record management for the transient data.

12. The method of claim 9 wherein providing automatic record management comprises:
ensuring that the number of records per context in the temporary storage table does not exceed one.

13. The method of claim 1 wherein the definition of the transient data is mapped to a temporary storage table during a design of the application.

14. The method of claim 1 further comprising:
allowing the application to access the transient data via an application programming interface (API) used for accessing transactional and/or reference data.

15. The method of claim 6 wherein the transient data is deleted from the temporary storage table by a background service based on the context identifier.

16. A non-transitory machine-readable storage medium storing executable instructions to cause a machine to perform a method comprising:
creating a definition of transient data corresponding to a unit of work to be performed by an application, wherein the definition of transient data comprises one or more fields that describe a format of one or more columns needed to store transient data;
mapping the definition of transient data to one or more columns of a temporary storage table, wherein a format of a mapped column corresponds to the format described by at least one field of the one or more fields of the definition of transient data;
storing the transient data in the one or more columns of the temporary storage table while the application performs the unit of work, the unit of work spanning one or more user sessions; and
deleting the transient data from the temporary storage table after the application completes the unit of work.

17. A system comprising:
a metadata repository to store a definition of transient data corresponding to a unit of work to be performed by an application, wherein the definition of transient data comprises one or more fields that describe a format of one or more columns needed to store transient data;
a temporary storage table to store the transient data while the application performs the unit of work, the unit of work spanning one or more user sessions; and
an object manager to map the definition of transient data to one or more columns of the temporary storage table, to use the mapping when processing the transient data, to store the transient data in the one or more columns of the temporary storage table, and to cause the transient data to be deleted from the temporary storage table after the application completes the unit of work, wherein a format of a mapped column of the temporary storage table corresponds to the format described by at least one field of the one or more fields of the definition of transient data.

18. The system of claim 17 wherein the definition of transient data comprises metadata characterizing the transient data.

19. The system of claim 17 further comprising:
a mapping table to store mappings of columns of the temporary storage table to the definition of the transient data.

20. The system of claim 17 wherein the object manager is further to associate the transient data with a context identifier in the temporary storage table.

21. The system of claim 20 wherein the object manager is further to filter the transient data based on a context.

22. The system of claim 20 wherein the object manager is further to provide automatic record management for the transient data.

* * * * *